United States Patent

Lee

[11] Patent Number: 5,989,390
[45] Date of Patent: Nov. 23, 1999

[54] FRICTION PAPER CONTAINING ACTIVATED CARBON

[75] Inventor: James M. Lee, Watertown, N.Y.

[73] Assignee: Knowlton Specialty Papers, Inc., Watertown, N.Y.

[21] Appl. No.: 09/226,750

[22] Filed: Jan. 6, 1999

[51] Int. Cl.⁶ ............................. D21F 11/00; F16D 69/00
[52] U.S. Cl. ..................... 162/141; 162/146; 162/152; 162/157.1; 188/251 A; 192/107 M; 428/317.9; 428/319.1; 428/323; 428/402; 428/408; 428/920; 428/367
[58] Field of Search ..................................... 162/146, 148, 162/152, 154, 157.1, 157.2, 141; 442/322; 188/251 A; 192/107 M; 428/317.9, 319.1, 323, 402, 408, 902, 920, 367

[56] References Cited

U.S. PATENT DOCUMENTS

| | | |
|---|---|---|
| 4,256,801 | 3/1981 | Chuluda . |
| 4,386,168 | 5/1983 | Fujimaki et al. ........................ 523/155 |
| 4,451,590 | 5/1984 | Fujimaki et al. ........................ 523/155 |
| 5,083,650 | 1/1992 | Seiz et al. . |
| 5,775,468 | 7/1998 | Lam et al. ............................ 188/251 A |
| 5,837,741 | 11/1998 | Schwarz et al. . |

*Primary Examiner*—Jose Fortuna
*Attorney, Agent, or Firm*—Wall Marjama Bilinski & Burr

[57] ABSTRACT

A fibrous friction material in a sheet form having a top surface and a bottom surface with at least one surface containing a mixture of from about 10 to 65% cellulose fibers, about 5 to 50% carbon fibers, about 5 to 50% activated carbon, about 1 to 20% novoloid fibers, up to 65% diatomatious earth particles, and latex in an amount sufficient to increase the strength of the said sheet, with said percentages being based on the total weight of said sheet. The material is impregnated with a thermosetting resin prior to use.

13 Claims, 7 Drawing Sheets

FRICTION PAPER CONTAINING ACTIVATED CARBON

FIELD OF THE INVENTION

This invention relates generally to friction material, and more specifically to a paper based friction material and friction members which contain activated carbon as a key component.

BACKGROUND OF THE INVENTION

Paper-based friction materials are used in wet brake and wet and dry clutch and torque conversion applications. These paper-type materials are typically cut into rings and bonded to support members for use in mechanical energy transfer applications. These papers are typically composite materials with fiber, fillers, friction modifiers, and resin components that are formulated to give appropriate friction, noise control, temperature resistance, and wear properties in each specific application. The papers are usually produced on wetlaid paper machines and saturated either in-line or off-line with resins to bond the components together. Typical components for friction papers include:

Cellulose, mineral, and polymeric fibers that add strength to the final product and provide an open matrix of voids for resin to fill during resin saturation;

Oil absorbent fillers such as diatomatious earth that assist in resin absorption, and in wet applications, promote oil flow through the paper to control in-use temperature degradation;

Friction modifiers such as carbon which, when blended in the paper, exhibit adequate friction and noise properties, and in-use wear life at elevated temperatures; and Binder resins such as phenolics, epoxies, melamines, and aromatic polyamides that give the paper mechanical shear strength, raise the thermal stability of other paper components, modify friction properties of the final product, and assist in bonding the final part to a support such as a ring.

Currently, transmissions are being designed to have smaller component clearances. These units run at elevated temperatures for long time intervals. Standard friction papers that have excellent wear and friction properties in automatic transmissions either quickly lose their friction properties or wear too fast at elevated temperatures.

U.S. Pat. No. 5,083,650 describes a carbon coated aromatic polyamide heat-resistant paper developed to address these shortcomings. The product has acceptable frictional properties at high temperatures and exhibits excellent resistance to wear in use, but is very expensive to manufacture due to the cost of the raw materials.

Another base material used in friction facings is a carbon impregnated woven cloth. This product exhibits excellent frictional and wear properties but is extremely expensive to manufacture because of the cost of producing the woven carbon cloth.

U.S. Pat. No. 4,256,801 describes a high carbon content friction material designed for use in high temperature applications under conditions of high total energy absorption and/or low cooling oil circulation. This patent teaches the use of graphite particles as nonabrasive friction modifiers to extend the useful life of the friction material. A shortcoming of this material design is that the graphite flake particles do not add any significant additional frictional properties to the final material. Another shortcoming of graphite flake particles is that they have very low porosity and do not allow for the flow of cooling oil through the individual particles to enhance the control of temperature degradation when the friction material is in use in a transmission clutch facing. Also, while the graphite flake particles bond to the saturating resin, it is believed that they do not provide for optimum integral shear strength of the bonded friction clutch facing during use.

SUMMARY OF THE INVENTION

It is therefore an object of the present invention to provide a friction paper which overcomes the disadvantages of the prior art described above.

It is a further object of the present invention to provide an economical friction facing which exhibits superior frictional and wear properties.

It is another object of the present invention to provide a friction material which exhibits superior control of temperature degradation when in use as a transmission clutch facing.

It is yet another object of the present invention to provide a friction material in which the friction component exhibits a high surface area and superior bond strength.

It is a further object of the present invention to provide a friction material which is suitable for use in high temperature applications under conditions of high total energy absorption and/or low cooling oil circulation.

The present invention is based upon the discovery that the use of activated carbon as a component in friction paper provides a superior product at a significantly reduced cost when compared to equivalent prior art materials.

The material of the present invention is produced from a combination of components on the papermaking process. The pores in the activated carbon have high surface area and bond to resin much more efficiently than the graphite flake particles of the prior art. This results in improved wear properties of the friction member produced from this material. The activated carbon further promotes oil flow through the individual particles to better resist product degradation at elevated use temperatures. The carbon may be in the form of powder particles or fibers, with powder particles being preferred because of economics.

In one embodiment, the material of the present invention is in the form of a porous, flexible, fibrous sheet comprising a mixture of cellulose fibers, carbon fibers and activated carbon powder, and includes a thermosetting resin. The thermosetting resin can be either a component of the original composition or can be added in a post treatment process. The material may also include other optional components such as diatomatious earth, thermoplastic fibers, and acrylic latex.

BRIEF DESCRIPTION OF THE DRAWING

For a fuller understanding of the nature and objects of the invention, reference should be made to the following detailed description of a preferred mode of practicing the invention, read in connection with the accompanying drawings, in which.

DETAILED DESCRIPTION OF THE INVENTION

In the present invention, any processing system that can be used to mix fibers and powders together such as drylaid, airlaid, coform, or wetlaid fiber processes coupled with coated, saturated, and slurry-impregnated resin addition processes can be used to produce the product. The material of the present invention has been made using standard paper machine and resin saturation equipment.

The following composition illustrates a preferred embodiment of the present invention, with the concentration of the various components being in weight percent.

Composition

The material is produced from the following mix of materials with the specific formulation listed being tested as hereinafter described:

| Composition | Specific | Narrow Range | Broad Range |
|---|---|---|---|
| Cellulose fiber (225-HS Fiber - Buckeye Cellulose) 2–4 mm length 25–35 micron diameter | 37% | 30–50% | 10–65% |
| Amorphous diatomatious earth Diafil-230-CR Minerals) | 23% | 15–50% | 0–65% |
| Milled carbon graphite fiber (Panex AGM-94, 150 micron length, 8 micron diameter-Ashbury Graphite) | 20% | 5–30% | 5–50% |
| Activated carbon powder (5597 Wood-based Activated Carbon, 95–100% less than 100 mesh-Ashbury Graphite) | 15% | 5–30% | 5–50% |
| Novoloid fiber (KF-10BT Kynol Fiber-Amercian Kynol) 0.3 mm length, 33 micron diameter | 5% | 3–10% | 1–25% |
| Acrylic latex (1562X117 latex-BF Goodrich) | 6% add-on | 3–10% | 0–20% |

The above product then is saturated with phenolic resin to have a total phenolic resin content of about 29% of the final product.

| Composition | Narrow Range | Broad Range |
|---|---|---|
| (295-E-5 - Ashland Chemical | 5–30% | 5–50% |

Suitable cellulose fibers which may be used include high alpha-cellulose cotton, wood pulps, linen, and rag.

Amorphous diatomatious earth is preferred over the crystalline type because of worker health and safety regulations Activated carbon powder replaces the flake graphite of the prior art, and because of the porous nature of the activated carbon, promotes oil microflow through the paper to control thermal degradation of the product in use, and adds bonding surface area for the resin to attach and increase the resistance to wear and integral shear strength of the product. It has also been found that the oxidized form of carbon has higher frictional properties than graphite flake, and adds to the final friction properties of the product, whereas flaked graphite specifically promotes lower frictional properties and is added to formulations to enhance slip characteristics. The activated carbon powders are commercially available and produced by conventional methods from wood, regenerated cellulose, coconut shells, cotton, polyacrylonitrile, phenolic, pitch, and other suitable carbonaceous material. The internal surface area of the activated carbon typically averages approximately 10,000 sq. ft/gm and has a density from about 0.08 to 0.5.

Novoloid fibers are included in the formulation to provide frictional properties over a broad range of operating temperatures and have excellent bond strength with phenolic resins to enhance integral shear strength of the paper in use.

Latex is added as a process aid to add strength to the paper so it can be handled and saturated. The latex is added to the slurry on the paper machine. Precipitatable water-based latexes also adhere to the friction particles in the slurry and help in particle retention on the wet end of the paper machine.

Suitable resins include phenolic, melamine, epoxy, and aromatic polyamide thermosetting types.

The cellulose, diatomatious earth, carbon fiber, carbon powder, novoloid fiber, and latex are all combined with water into a slurry and pumped to the forming wire of a paper machine. The water in the slurry drains through the openings of the wire and the wet paper is carried to a drier section where the remaining water is removed by drying. The dried paper is then saturated with resin by conventional means. This roll of unsaturated paper is saturated with phenolic resin in a typical immersion, surface coat, or spray saturation process and is carried through a drying oven to be dried to a "B" stage semicured state. It is rolled onto a reel and is either slit to size in roll form or is sheeted to its final dimensions for packaging and shipment. The final product has the following typical physical properties:

| Composition | Specific | Range |
|---|---|---|
| Basis Weight (lb/3000 ft$^2$) | 370 | 100–600 |
| Thickness(mils) | 40 | 0.008"–0.075" |
| Resin Input (%) | 29 | 5–50% |

The following formulation for standard commercial friction paper was used for comparative tests:

| Compsition | Percentage (%) |
|---|---|
| Cellulose fiber (Buckeye Cellulose 225HS Fiber) | 55 |
| Amorphous diatomatious earth (CR Minerals Diafil-230) | 45 |
| Acrylic latex (BF Goodrich 1562X117 latex) | 6 add-on |
| Phenolic resin (Ashland Chemical 295E-5) | 29 |
| Basis Weight (lb/3000 ft$^2$) | 370 |
| Thickness (mils) | 40 |
| Resin Input (%) | 29 |

Figure 1A:
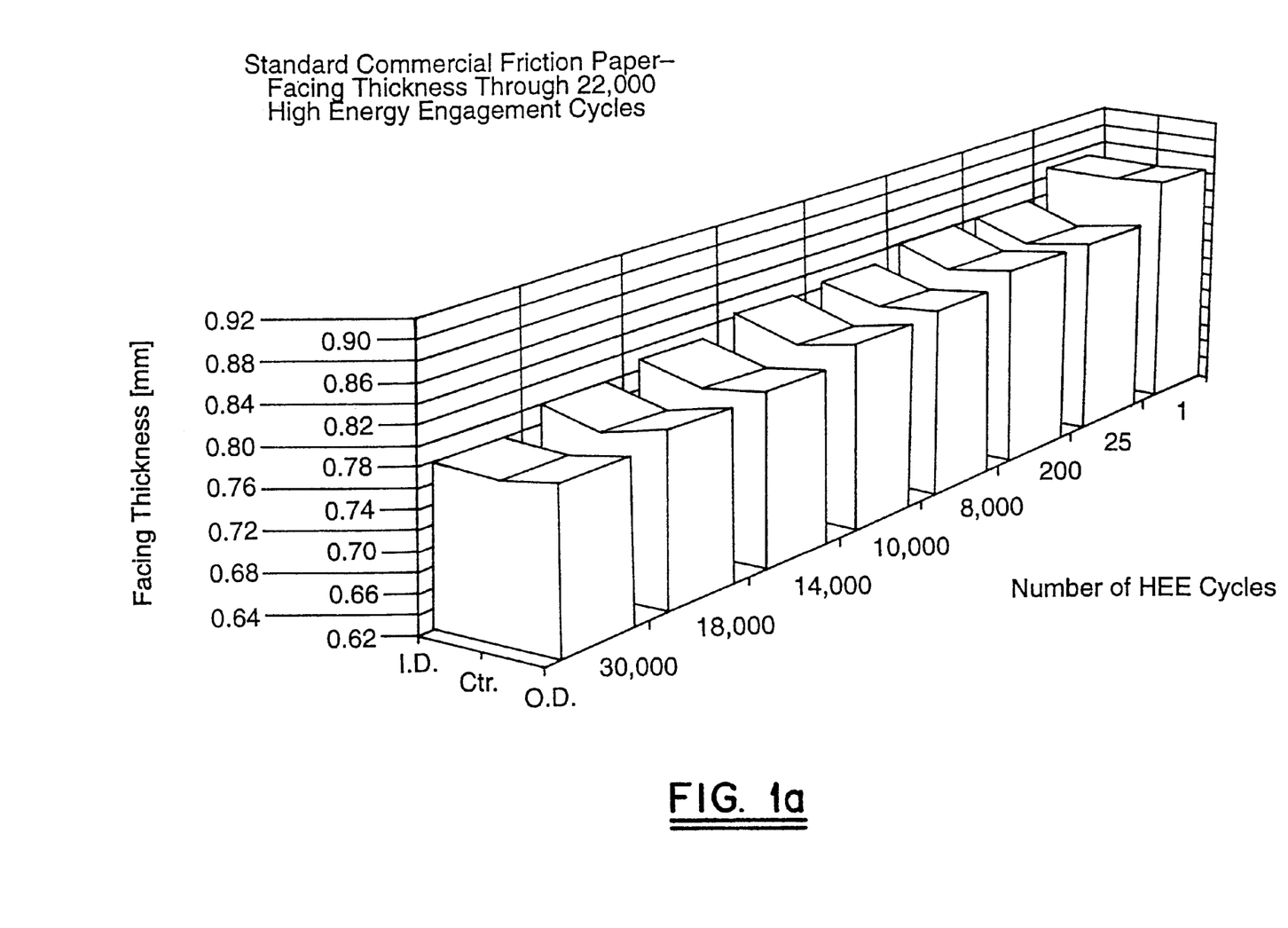
FIGS. 1a and 1b are a graphic illustrations of facing thickness loss comparing prior art commercial friction paper to the present invention.
Figure 1B:
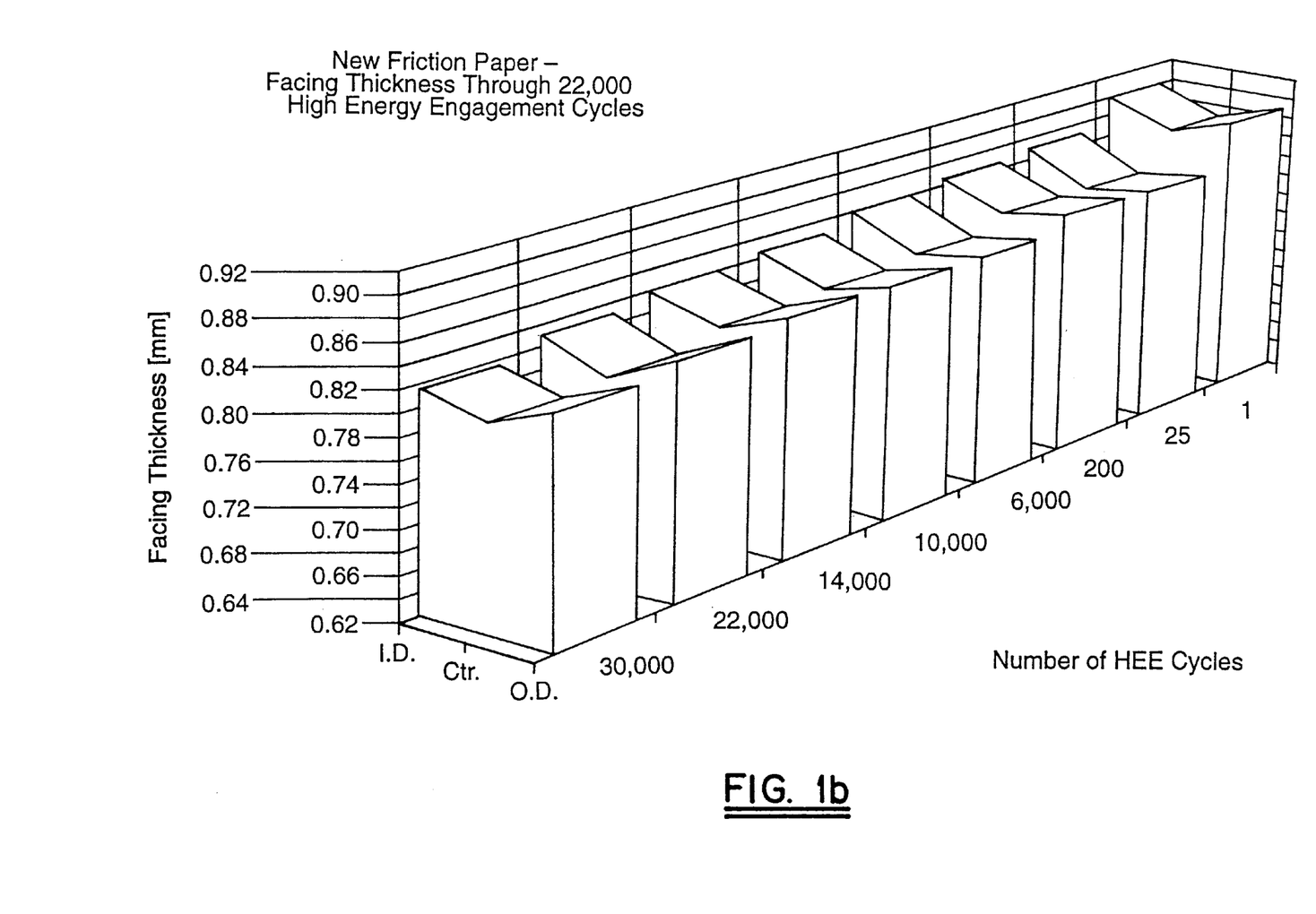
Figure 2A:
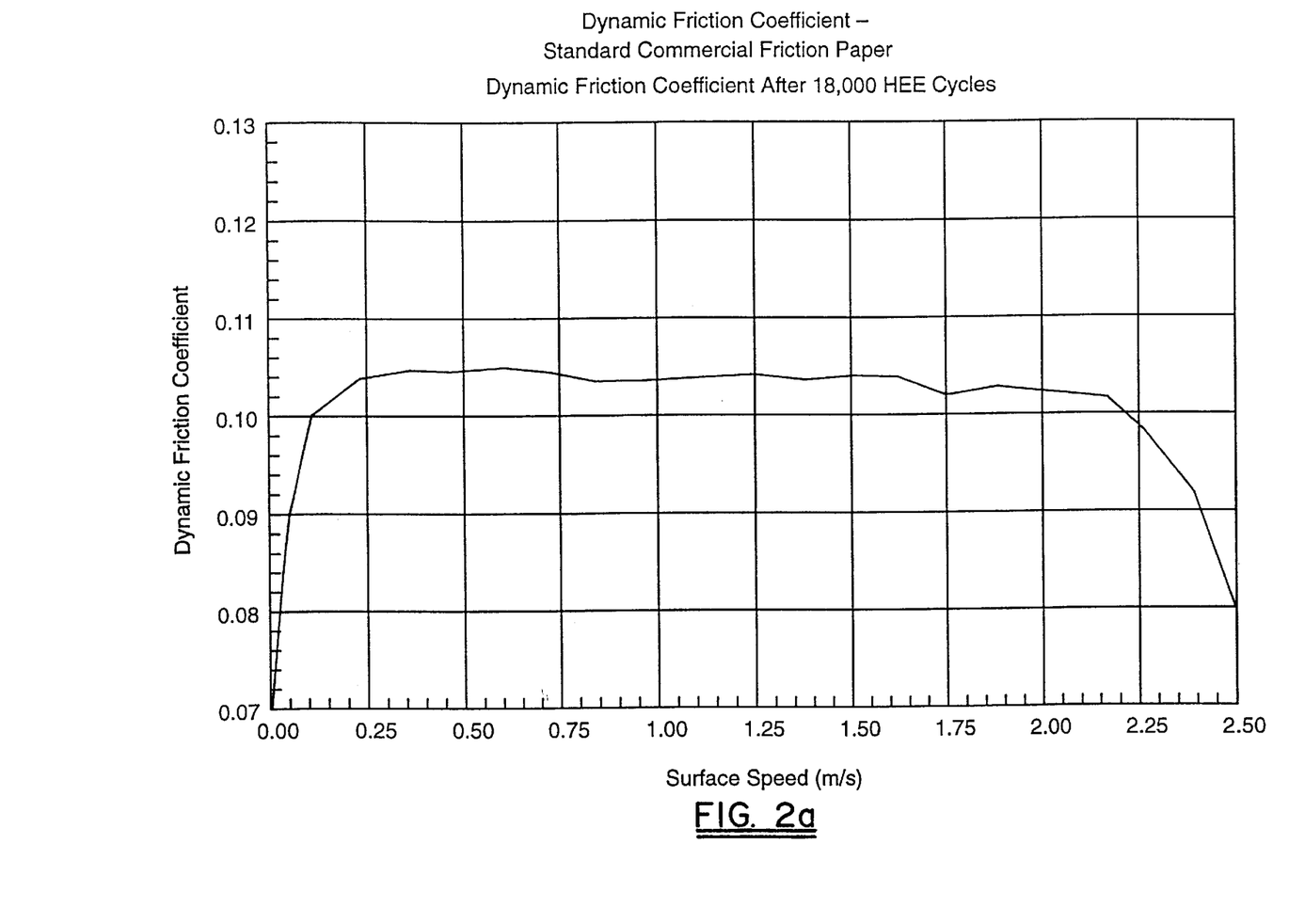
FIGS. 2a, 2b, 3a, 3b, and 3c represent a plot of a comparison of the friction coefficient gradient for standard commercial friction paper and friction paper of the present invention.
Figure 2B:
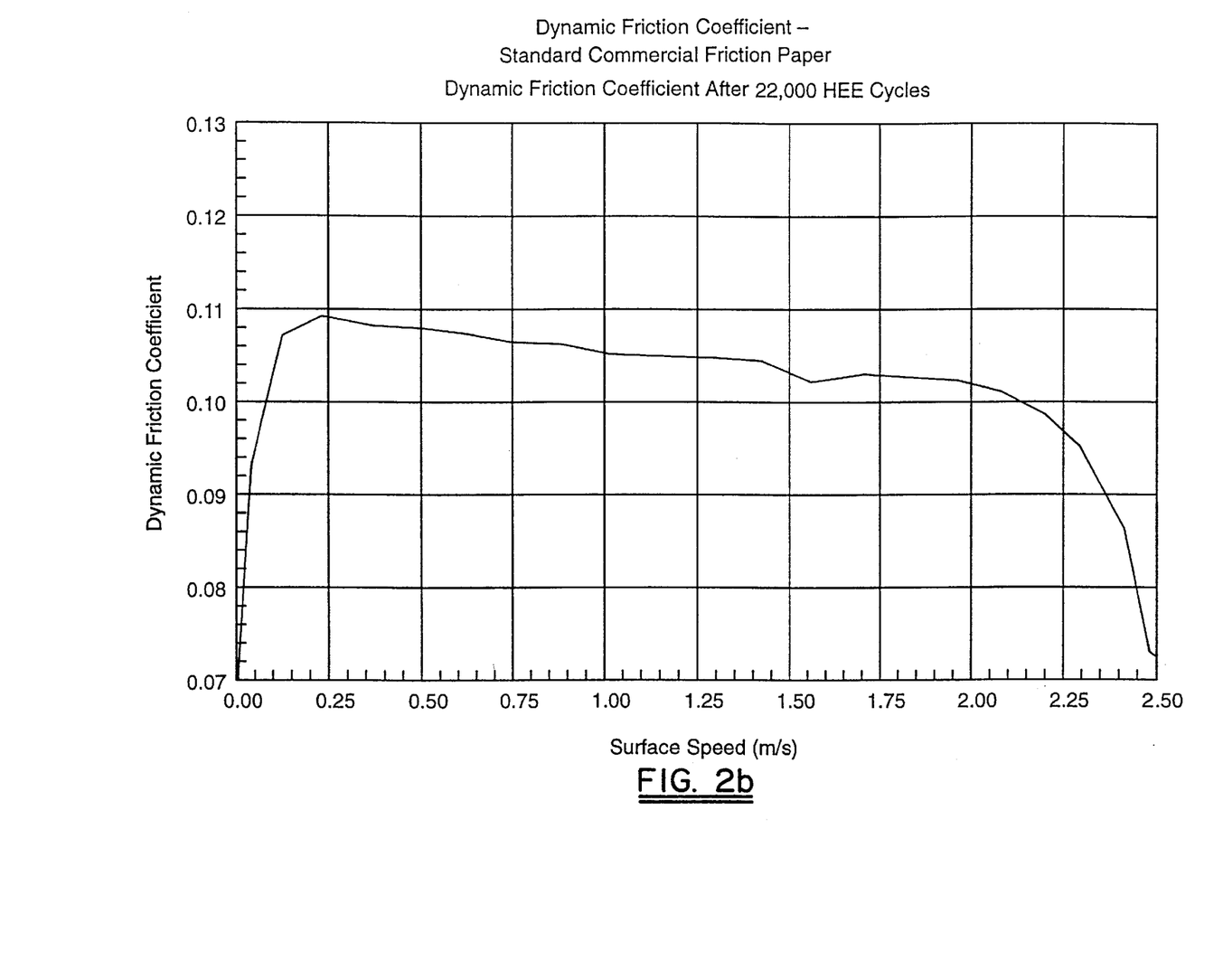
Figure 3A:
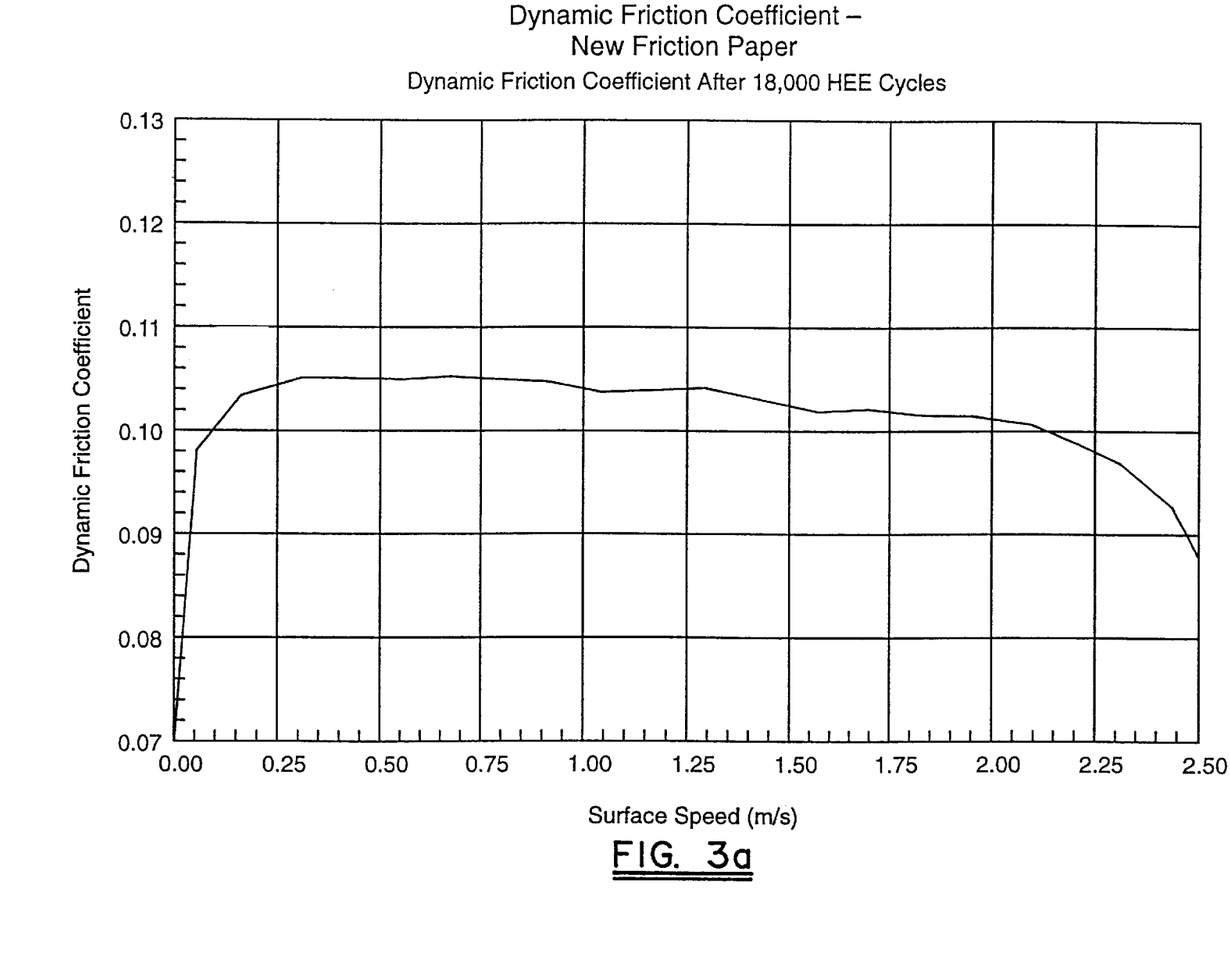
Figure 3B:
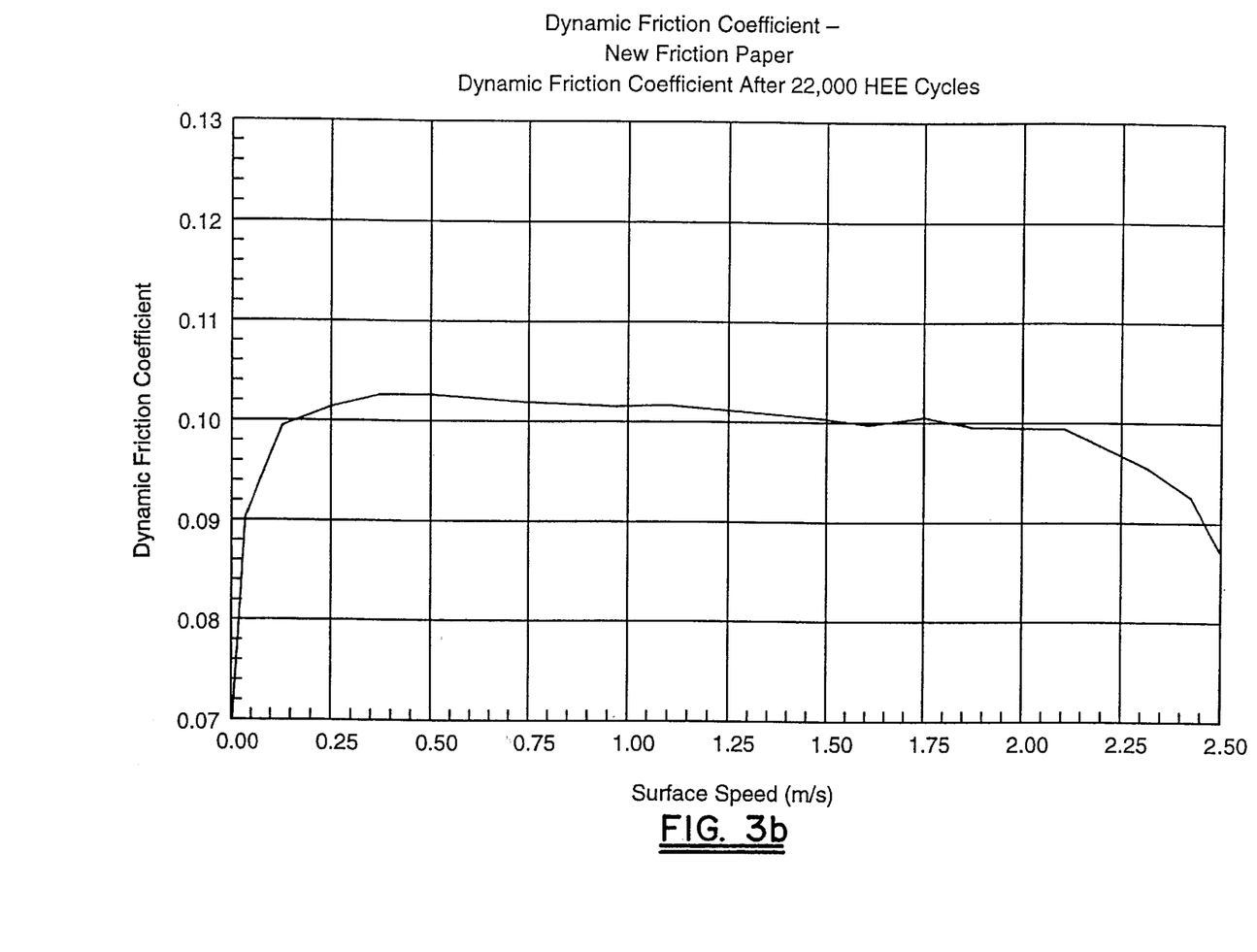
Figure 3C:
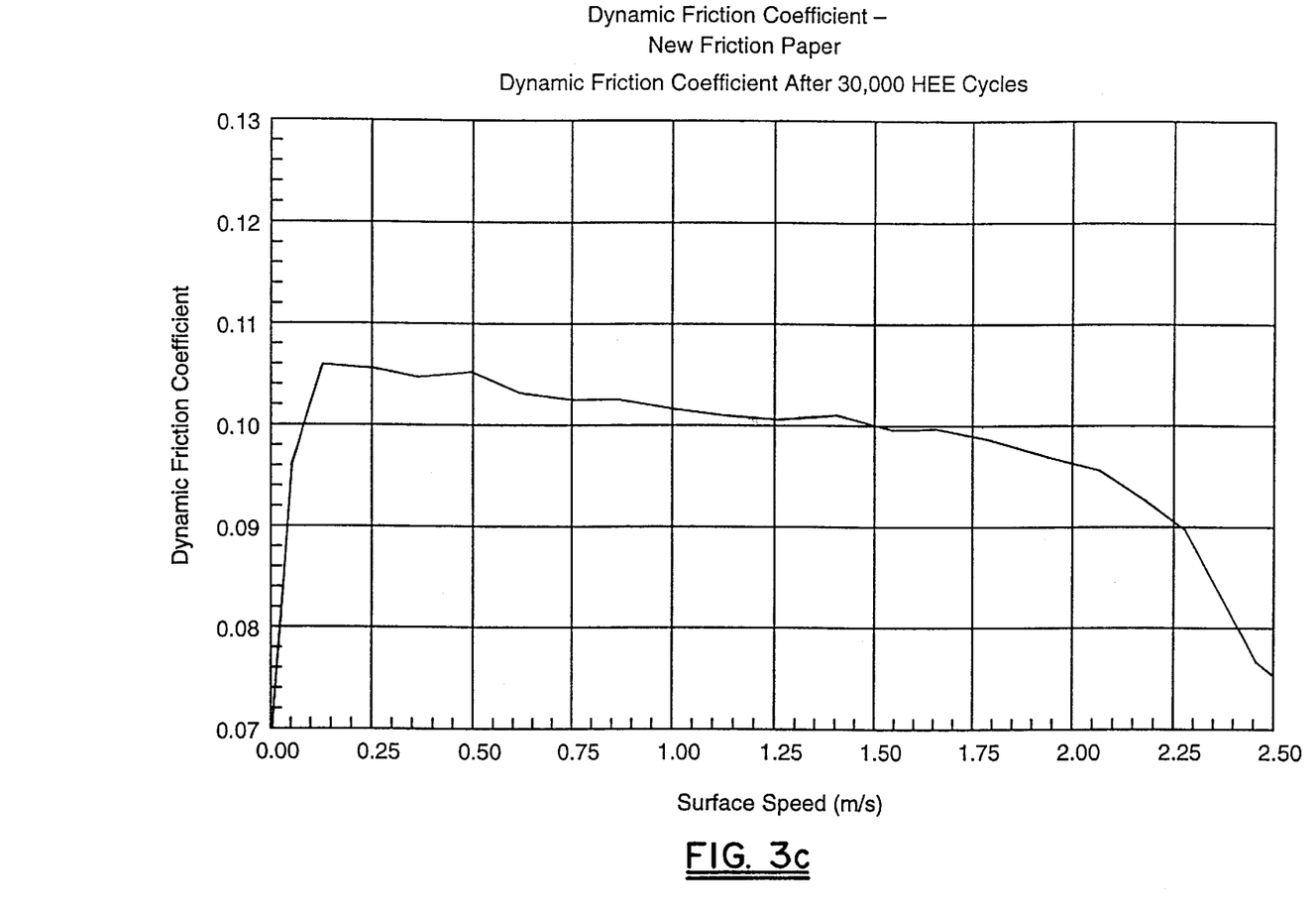

Comparison of Friction and Wear Properties of Invention to Standard Commercial Friction Paper Products Testing Parts: torque convertor clutch facing plate
Facing Materials:
(1) standard commercial friction paper
(2) invention
Oil: automatic transmission fluid
Test rig: friction dynamometer
High Energy Engagement Energy: 1.7 Joules/mm$^2$
Results:
1. Facing Thickness Loss
FIG. 1 shows the amount of facing thickness loss of the bonded material during test for both the standard commercial and new friction papers of the present invention. The standard commercial paper loses 0.09 mm thickness over 22,000 cycles while the new paper loses 0.07 mm thickness over the same cycle count. In fact, 30,000 cycles are required for the new paper to lose the same amount of thickness, an indication of its improved resistance to wear.
2. Friction Coefficient Gradient (FCG)
FIGS. 2 and 3 compare the FCG's of the two products at various engagement cycle counts. The standard commercial friction paper exhibits significant loss of FCG at 22,000 cycles and a substantial loss of dynamic friction coefficient (DFC) at surface speeds above 2m/sec. The new friction paper of the present invention shows more consistent FCG and retains higher DCF above 2 m/sec. at 22,000 cycles. Significant degradation of FCG is not seen until about 30,000 cycles, another indication of its consistent frictional property performance through high energy inputs and longer wear life.

3. Visual Surface Pitting

Observations were made and photographs taken of tested torque converter facings after 22,000 high energy engagement cycles and graphically indicates, at the same energy inputs, that there are significantly higher levels of pitting in the standard commercial friction paper than in the new friction paper, visually confirming the above conclusions.

While the present invention has been particularly shown and described with reference to the preferred mode as illustrated in the drawing, it will be understood by one skilled in the art that various changes in detail may be effected therein without departing from the spirit and scope of the invention as defined by the claims.

I claim:

1. A fibrous friction material suitable for use in wet friction applications in a sheet form having a top surface and a bottom surface with said sheet comprising in weight percent, a mixture from about 10 to 65% cellulose fibers, about 5 to 50% carbon fibers, about 5 to 50% activated carbon, from about 1 to 20% novoloid fiber, up to 65% diatomatious earth particles, and latex in an amount sufficient to increase the strength of the said sheet with said percentages being based on the total weight of said sheet, whereby the activated carbon promotes the flow of cooling fluid through the individual carbon particles to reduce temperature degradation of the friction material in use.

2. The friction material of 1 in which the sheet is impregnated with a thermosetting resin in a concentration of about 5 to 50% by weight of the total dry sheet.

3. The material of claim 1 in which the cellulose fibers are selected from the group consisting of cotton, wood, pulp, linen, and rags.

4. The material of claim 1 in which the activated carbon powders are produced from the group consisting of wood, regenerated cellulose, coconut shells, cotton, polyacrylonitrile, phenolic and pitch.

5. The material of claim 1 in which the thermosetting resin is selected from the group consisting of phenolics, epoxies, melamines, and aromatic polyamides.

6. The friction material according to claim 1 in which the mixture comprises about 37% cellulose fibers, about 23% diatomatious earth particles, about 20% carbon fiber, about 15% activated carbon, about 5% novoloid fiber, said percentages being based on the total weight of said sheet, and about 6% latex which is added to said sheet and a further addition of thermosetting resin in a concentration of about 29% by weight of the total dry sheet.

7. A fibrous friction material suitable for use in wet friction applications in a sheet form comprising in weight percent, a mixture of from about 30 to about 50% cellulose fibers, from about 15 to about 50% diatomatious earth particles, from about 5 to about 30% carbon fiber, from about 5 to about 30% activated carbon, from about 3 to about 10% novoloid fiber, and from about 3 to about 10% latex solids, said percentages being based on the total weight of said sheet and an addition of thermosetting resin in a concentration from about 20 to about 40% by weight of the total dry sheet, whereby the activated carbon promotes the flow of cooling fluid through the individual carbon particles to reduce temperature degradation of the friction material in use.

8. A friction facing suitable for engaging mechanisms, said friction facing being in the form of a fibrous friction material suitable for use in wet friction applications in a sheet form comprising a mixture of from about 10 to about 65% cellulose fiber, up to 65% diatomatious earth, from about 5 to about 50% carbon fiber, from about 5 to 50% activated carbon, from about 1 to about 25% novoloid fiber, and latex in an amount sufficient to increase the strength of said sheet, said percentages being based on the total weight of said sheet and an addition of thermosetting resin in a concentration form about 5 to 50% by weight of the total dry sheet, whereby the activated carbon promotes the flow of cooling fluid through the individual carbon particles to reduce temperature degradation of the friction material in use.

9. The friction facing according to claim 8 in which the cellulose fibers are selected from the group consisting of cotton, wood pulp, linen, and rags.

10. The friction facing according to claim 8 in which the activated carbon powder is produced from the group consisting of wood, regenerated cellulose, coconut shells, cotton, polyacrylonitrile, phenolic and pitch.

11. A friction facing according to claim 8 in which the thermosetting resin is selected from the group consisting of phenolics, epoxies, melamines, and aromatic polyamides.

12. A friction facing suitable for engaging mechanisms, said friction facing being in the form of a fibrous friction material suitable for use in wet friction applications in a sheet form comprising a mixture of from about 30 to about 50% cellulose fibers, from about 15 to about 50% diatomatious earth particles, from about 5 to about 30% carbon fiber, from about 5 to about 30% activated carbon, from about 3 to about 10% novoloid fiber, and from about 3 to about 10% latex solids, said percentages being based on the total weight of said sheet and an addition of thermosetting resin in a concentration from about 20 to about 40% by weight of the total dry sheet, whereby the activated carbon promotes the flow of cooling fluid through the individual carbon particles to reduce temperature degradation of the friction material in use.

13. A friction facing suitable for engagement mechanisms, said friction facing being in the form of a fibrous friction material suitable for use in wet friction applications in a sheet form with a top surface and a bottom surface with said friction material comprising about 37% cellulose fibers, about 23% diatomatious earth particles, and about 20% carbon fibers, about 15% activated carbon, about 5% novoloid fiber, said percentages being based on the total weight of said sheet and about 6% latex which is added to said sheet and a further addition of thermosetting resin in a concentration of about 29% by weight of the total dry sheet, whereby the activated carbon promotes the flow of cooling fluid through the individual carbon particles to reduce temperature degradation of the friction material in use.

* * * * *